June 22, 1926.
J. W. HAWKINS
1,589,960
AUTOMOBILE BED
Filed May 14, 1925
2 Sheets-Sheet 1
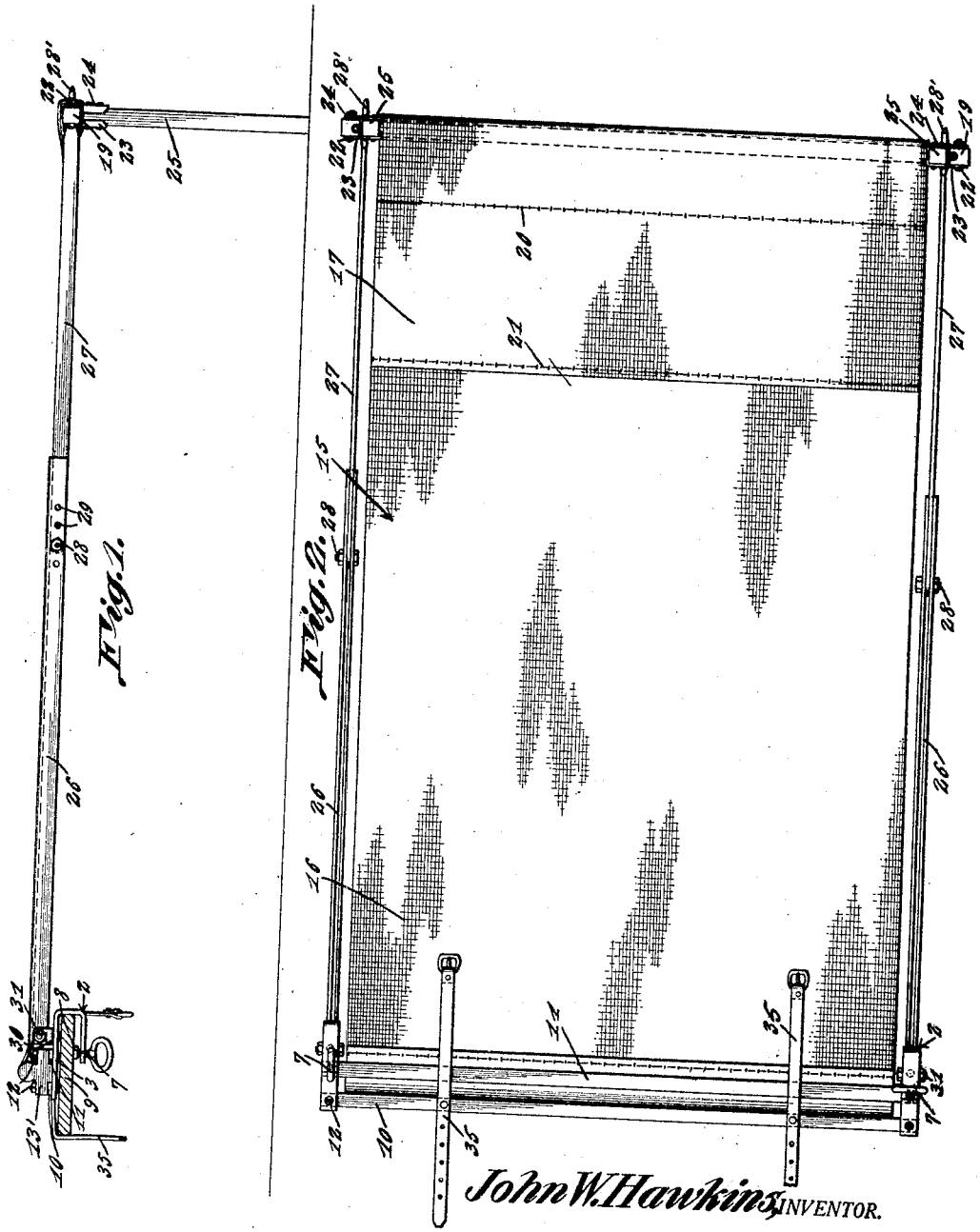
John W. Hawkins, INVENTOR.
BY
Geo. F. Kimmel, ATTORNEY.

June 22, 1926.
J. W. HAWKINS
1,589,960
AUTOMOBILE BED
Filed May 14, 1925    2 Sheets-Sheet 2
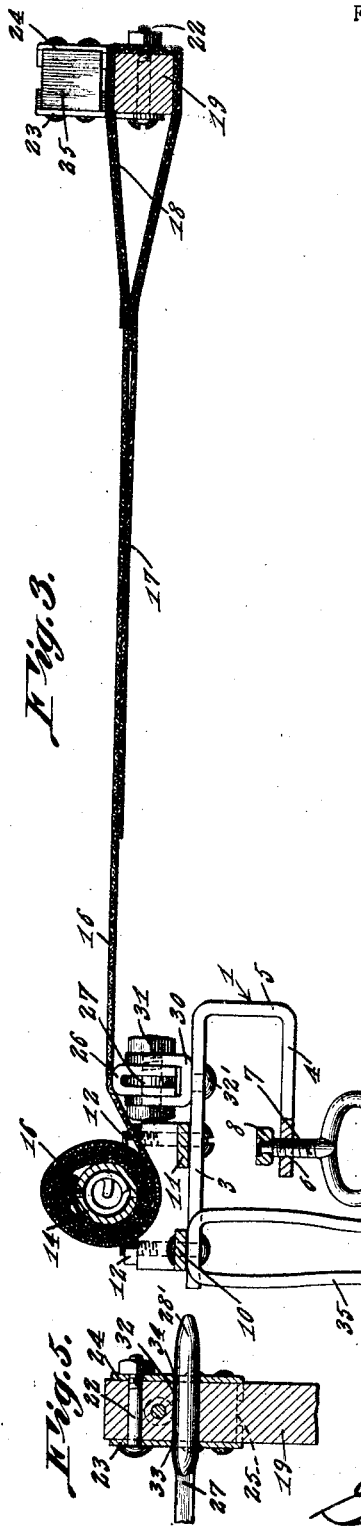
John W. Hawkins, INVENTOR.
BY
Geo. P. Kimmel. ATTORNEY.

Patented June 22, 1926.

1,589,960

UNITED STATES PATENT OFFICE.

JOHN W. HAWKINS, OF PICHER, OKLAHOMA.

AUTOMOBILE BED.

Application filed May 14, 1925. Serial No. 30,234.

The invention relates to an automobile bed and has for its object to provide, in a manner as hereinafter set forth, an attachment for automobiles, or other vehicles and conveyances, whereby when the attachment is set up and applied, it will provide a bed or stretcher for camping, hospital or other purposes.

A further object of the invention is to provide, in a manner as hereinafter set forth, an attachment for automobiles or other vehicles, capable of being extended to provide a bed or stretcher for camping, hospital or other purposes, and further so constructed and arranged that it can be readily collapsed and rolled up, whereby when in such latter condition it can be stored or carried within a space of small compass.

A further object of the invention is to provide, in a manner as hereinafter set forth, an attachment for automobiles or other vehicles, adapted when set up and applied to provide a bed or stretcher for camping, hospital or other purposes and including means whereby the length of the bed or stretcher can be adjusted.

A further object of the invention is to provide, in a manner as hereinafter set forth, an attachment for vehicles in the form of a collapsible bed having means for detachably connecting it to the running board of an automobile or other similar support, and whereby the running board or support may be utilized as the head of the bed.

A further object of the invention is to provide, in a manner as hereinafter set forth, an attachment for automobiles or other vehicles in the form of a collapsible bed capable of being folded in a compact manner so it can be stored or carried within a small space when not in use, and to further provide the attachment with a spring controlled bed bottom automatically windable when released from set-up position.

Further objects of the invention are to provide a collapsible automobile bed, in a manner as hereinafter set forth, and which is simple in its construction and arrangement, strong, durable, compact when folded, thoroughly efficient in its use, conveniently set up and comparatively inexpensive to manufacture.

With the foregoing and other objects in view it will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings wherein like reference characters denote corresponding parts throughout the several views:

Figure 1 is a side elevation of an automobile bed, in accordance with this invention, extended.

Figure 2 is an inverted plan view of an automobile bed in accordance with this invention, extended.

Figure 3 is a longitudinal sectional view with the bed partly extended.

Figure 4 is a fragmentary view, in sectional plan, with the bed partly folded.

Figure 5 is a fragmentary view in vertical section.

Referring to the drawings in detail 1 and 2 generally indicate a pair of yoke-shaped members which are longitudinally disposed with respect to the bed when the latter is extended and each of said members include an upper arm 3, a lower arm 4 and a forward arm 5. The arm 4 is of less length than the arm 3 and is maintained in spaced relation with respect to the latter by the arm 5. The arm 4 has an opening 6 formed with a threaded wall which is engaged by an inverted clamping screw 7 having a headpiece 8 swivelly connected to its upper end. The members 1, 2 in connection with the clamping screw 7, provide means for fixedly securing the said members 1 and 2 to the running board 9 of the vehicle. The members 1 and 2 not only provide means for detachably clamping the attachment to the running board 9, but further constitute supporting elements for the body portion of the attachment and for the side rails of the bed bottom.

The body portion of the attachment consists of a pair of spaced parallel bars 10 and 11 which are secured at their ends to the arms 3 of the members 1 and 2 through the medium of the hold-fast devices 12. The hold-fast devices 12 also provide means for securing to the ends of the bars 10 and 11 bearing members 13, 14 and these latter bridge the space between the bars 10 and 11. Journalled in the bearings 13 is a spring controlled winding roller 14 to which the bed bottom, referred to generally by the reference character 15, is connected and which is automatically windable on the roller 14 when the bed bottom 15 is released.

The bed bottom 15 is formed from a length of canvas 16, of substantial width and a length of weather proof fabric 17 of the same width as the width of the canvas 16. The canvas 16 is hemmed at its outer end as at 18 for the passage of a stay member 19, which as shown, is a bar, square in cross-section and of a length greater than the width of the bed bottom 15 so as to extend from each end thereof. The hemmed portion of the canvas 16 is secured in any suitable manner to the stay member 19. The weather proof fabric 17 is positioned against and secured to the canvas 16 in a manner whereby said fabric 17 will enclose the hem 18 and be positioned against the lower face of the canvas 16 for a portion of the length thereof. The fabric 17 is secured to the canvas 16 by transverse rows of stitching 20, 21.

Mounted in each of the ends of the stay member 19 is a pivot bolt 22 for a pair of hinge members 23, 24. Each pair of hinge members for a portion of their length is fixedly secured to a bar 25 forming a supporting leg for the outer end of the bed bottom 15 when the latter is extended, see Figure 1. Each of the bars 25, through the medium of a pair of hinge members and a bolt 22, is hinged to the stay member 19 and owing to the construction of the hinge members the bars 25 can be folded to the position shown in Figures 3 and 4. When the bars 25 are extended to supporting position they abut against the lower face of the stay member 19 at points removed from the ends thereof, see Figure 2. The hinge members 23 and 24 are flanged so as to overlap the bars 25, see Figures 3 and 4.

The side members or rails for the bed bottom 15 also act to maintain the bed bottom extended, and as each side member or rail is of the same construction, but one will be described, as the description of one will apply to the other. Each of the side members consist of an inverted yoke-shaped rear section 26 and a flat forward section 27 provided with a rounded projection 28 at its free end. The section 27 is lengthwise adjusted in the section 26, and after adjustment is pivotally connected therewith by a bolt 28. The section 26 is formed with a series of openings 29 to receive the bolt 28 to provide for pivotally connecting the section 27 when adjusted with respect to the section 26.

Each side member or rail is pivotally connected to a member 1 or 2 and for such purpose a yoke 30 and a pivot bolt 31 is provided. The yoke 30 is pivotally connected as at 32' to the arm 3 and the rear end of the section 26 is pivotally connected to the yoke 30 by the bolt 31.

The stay member 19, in proximity to each end thereof, is provided with an opening 32 which aligns with the openings 33, 34 formed in a pair of hinge members and the aligning openings are provided for the passage of the projection 28 to maintain the bed bottom 16 and supporting legs in extended position, see Figure 2.

When the bed is folded, the section 27 is folded within the section 26 and the latter, with the yoke 30, swung on the pivot 32, whereby the side member or rail will assume the position shown in Figure 4. The bars 25 are folded to a position over the stay member 19 as shown in Figures 3 and 4. The bed bottom 15 is then wound up on the roller 14 and will be protected from inclement weather by the weather proof fabric 17, that is to say, the fabric 17 will wind around the canvas 16 and protect the same. After the parts are in the position as stated, they are maintained in such position by a pair of flexible tie-members 35 which are secured intermediate their ends to the bar 10.

When it is desired to extend the bed, the side members or rails are adjusted to the position shown in Figure 2 and the bed bottom pulled off the roller 14 to the desired extent and the bars 25 adjusted to supporting position after which the projections 28 are extended through the aligning openings 32, 33, 34 and the bed is then in position for use.

The bed when folded, can remain coupled to the running board 9, or removed therefrom and stored in the vehicle.

It is thought the many advantages of an automobile bed, in accordance with this invention, can be readily understood, and although the preferred embodiment of the invention is as illustrated and described, yet it is to be understood that changes in the details of construction can be had which will fall within the scope of the claims hereunto appended.

What I claim is:—

1. An automobile bed comprising a spring controlled windable bed bottom formed of a body portion consisting of a web of fabric of substantial length and width and an impervious element for protecting the bed bottom when folded, said element consisting of a length of impervious fabric bent upon itself to provide a pair of folds each of the same width as said web, the folds of said element overlapping the faces of the outer terminal portions of said web and said element further having its end secured to said terminal portion of the web.

2. An automobile bed comprising a spring controlled windable bed bottom consisting of a body portion formed of a web of fabric of substantial length and width and an impervious element to protect the bed bottom when wound up, said element consisting of a length of impervious fabric bent upon itself to provide a pair of folds, each of the same width as said web, the folds of said element overlapping and engaging the outer faces of the outer terminal portion of said web, said folds having the free ends thereof secured to said web, one of said folds being of materially greater length than the other.

3. An automobile bed comprising a spring controlled winding roller, supporting means therefor adapted to be detachably connected with the automobile, a length of flexible material constituting a bed bottom connected to and automatically winding on said roller and provided at its outer end with a hem, a stay member extending through said hem, bodily carried with said bed bottom and projecting from each side thereof, a pair of foldable supporting legs hinged to the outer ends of said stay member and foldable on said hem, and means pivotally connected to said supporting means and engageable in said stay member and in the hinges for the legs for maintaining said bed bottom and supporting legs in extended position, the said retaining means when in operative position arranged at each side of said bed bottom.

4. An automobile bed comprising a spring controlled winding roller, supporting means therefor adapted to be detachably connected with the automobile, a length of flexible material constituting a bed bottom connected to and automatically winding on said roller and provided at its outer end with a hem, a stay member extending through said hem, bodily carried with said bed bottom and projecting from each side of the latter, a pair of foldable supporting legs hinged to the outer ends of said stay member and foldable on said hem, means pivotally connected to said supporting means and engageable in said stay member and in the hinges for the legs for maintaining said bed bottom and supporting legs in extended position, and a folded strip of impervious material having its end secured to said bed bottom, completely enclosing said hem and further positioned against the lower face of said bed bottom adjacent to said hem and constituting a protector for the bed bottom when wound up on the roller.

5. An automobile bed comprising a spring controlled winding roller supporting means therefor adapted to be detachably connected with the automobile, a length of flexible material constituting a bed bottom connected to and automatically winding on said roller and provided at its outer end with a hem, a stay member extending through said hem, bodily carried with said bed bottom and projecting from each side thereof, a pair of foldable supporting legs hinged to the outer ends of said stay member and foldable on said hem, means pivotally connected to said supporting means and engageable in said stay member and in the hinges for the legs for maintaining said bed bottom and supporting legs in extended position, the said retaining means when in operative position arranged at each side of said bed bottom, and a folded strip of impervious material having its ends secured to said bed bottom, completely enclosing said hem and further positioned against the lower face of said bed bottom adjacent to said hem and providing a protector for the bed bottom when wound up on said roller.

6. In an automobile bed a spring controlled winding roller, a support therefor, means for detachably clamping said support to the automobile, a flexible bed bottom connected to and automatically winding on said roller, hinged supporting legs connected with each side of the outer end of said bed bottom and foldable over and against said outer end and bodily carried by the bed bottom, a lengthwise adjustable and foldable retaining means pivotally connected to said support and detachably engaging with each side of the outer end of the bed bottom and the upper ends of said legs for maintaining the bed bottom extended and the legs in supporting position for the outer end of the bed bottom, and a folded strip of impervious material secured to and having the folds thereof enclosing the outer terminal portion of the bed bottom and providing a protector for the latter and said legs when the bed bottom is wound up on the roller.

In testimony whereof, I affix my signature hereto.

JOHN W. HAWKINS.